March 22, 1932. J. F. O'CONNOR 1,850,564
HAND BRAKE
Filed Nov. 18, 1929
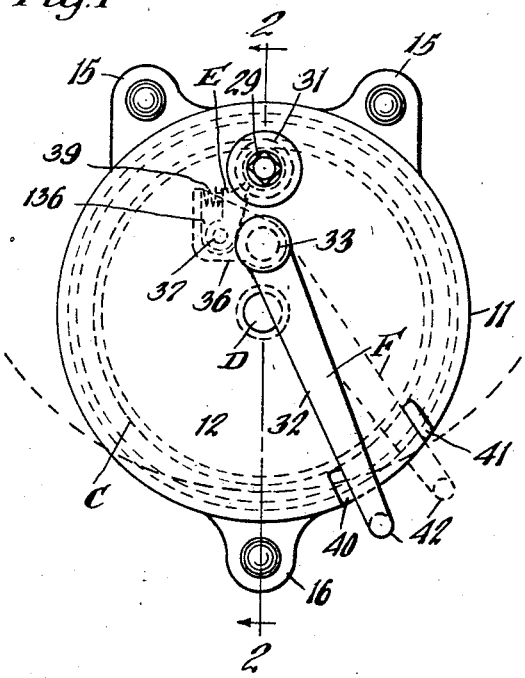
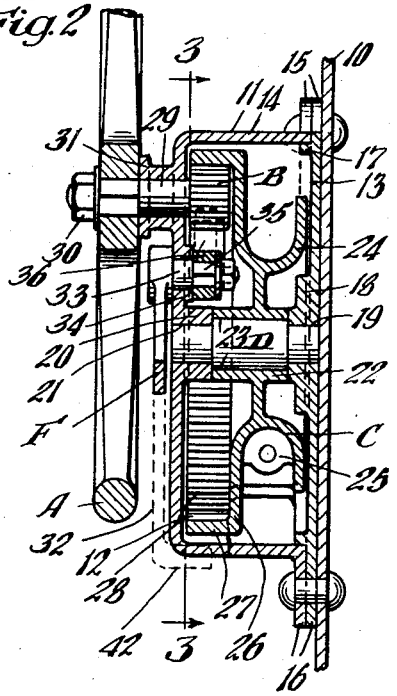
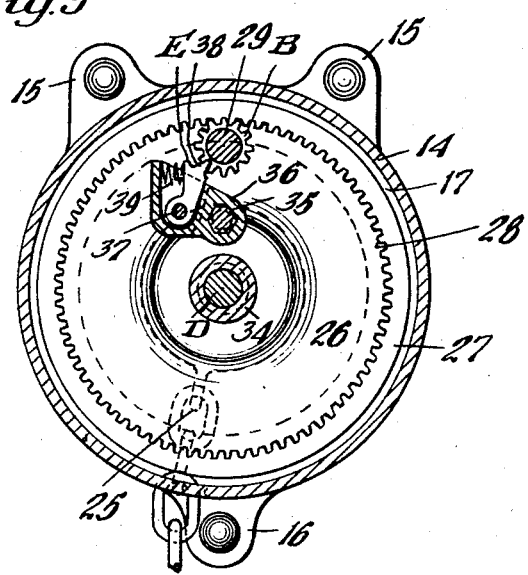
Witness
Wm. Geiger
Inventor
John F. O'Connor
By Joseph Harris
his Atty.

Patented Mar. 22, 1932

1,850,564

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed November 18, 1929. Serial No. 407,912.

This invention relates to improvements in hand brakes.

One object of the invention is to provide a hand brake of the gear driven type including a chain winding drum and cooperating hand wheel of simple and compact design, wherein the drum is provided with an annular flange having internal gear teeth cooperating with a pinion rotatable with the hand wheel, whereby the pinion is located internally of the drum gear, thus reducing the space occupied by the parts, and wherein retrograde movement of the drum is prevented by a locking dog cooperating directly with the pinion, thus dispensing with the usual locking ratchet wheel co-acting with the locking dog.

A further object of the invention is to provide in a hand brake having a chain winding drum, a locking member cooperating with a toothed element rotatable with the drum to prevent retrograde movement thereof, wherein the locking member is pivotally mounted on a swinging lever and is yieldingly sustained on said lever to permit ratcheting when the brake chain is being wound and is held against movement with respect to the lever to hold the drum against retrograde movement and the lever is positively limited against movement in a direction to hold the dog in locking engagement, and the dog is thrown out of operative engagement with the toothed member by manual swinging of the lever in a reverse direction.

Another object of the invention is to provide a hand brake including a winding member rotatable about a horizontal axis, a toothed member rotatable with the winding member, and means for locking said winding member against rotation in an unwinding direction, including a lever mounted to swing about a horizontal axis and a locking dog mounted on the lever cooperating with the toothed member, the dog being bodily swingable with the lever to disengage the same from said member and being yieldable with respect to the lever to permit ratcheting action during the winding of the brakes, wherein the dog has shouldered engagement with the lever and the lever is held against movement in one direction by stop means to hold the dog in locking relation with the toothed member.

Other objects of the invention will more clearly appear from the description and claims hereinafter following.

In the drawings, forming a part of this specification, Figure 1 is a front elevational view of my improved hand brake mechanism. Figure 2 is a vertical sectional view corresponding substantially to the line 2—2 of Figure 1 and illustrating the brake mechanism as mounted on the end wall of a railway car. And Figure 3 is a vertical sectional view corresponding substantially to the line 3—3 of Figure 2.

In said drawings, 10 designates the vertical end wall member of a railway car to which the improved brake mechanism is secured. In carrying out my invention, I employ a housing 11 in which the operated parts of the hand brake mechanism are enclosed. As most clearly shown in Figures 1 and 3, the housing 11 is in the form of a substantially cylindrical box-like member having front and rear walls 12 and 13 which are vertically disposed and an annular wall 14 in the form of a flange which is integral with the front wall 12. The back wall 13 is in the form of a heavy plate having upstanding securing lugs 15—15 at the upper end and a depending securing lug 16 at the bottom end. The annular wall 14 of the front section of the housing is provided with similar lugs 15—15 and 16 which register with the corresponding lugs of the back wall 13. The housing is secured to the end wall 10 of the car in any suitable manner, rivets being preferably employed which extend through alined openings in the end wall 10 and the lugs of the wall 13 of the housing and the lugs of the front section of the housing. The wall 13 is provided with an annular rib 17 on the forward side thereof which is telescoped within the annular wall 14 of the front section of the housing, the rear edge of the annular wall 14 bearing on the plate 13. At the central portion, the wall 13 is provided with an outwardly projecting enlargement 18 having a bearing opening 19 therein for a purpose hereinafter pointed out. The front wall 12 of the housing is provided with an inwardly projecting central boss 20 which has a bearing opening 21 in alinement with the bearing opening 19 in the wall 13.

My improved hand brake mechanism proper comprises broadly an operating hand wheel A, a driving pinion B connected to the hand wheel, a brake chain winding drum C disposed within the housing 11, a supporting shaft D for the drum, a locking dog E and an operating bell crank lever F on which the dog is mounted.

The winding drum C has a hub portion 22 which is journaled on the enlarged central portion 23 of the supporting shaft D, the outer ends of the shaft D being mounted in the openings 19 and 21 of the rear and front walls of the housing 11. The drum C is provided with a portion 24 upon which the brake chain is adapted to be wound, the portion 24 being of groove-like formation so as to properly guide and accommodate the chain. A transverse web 25 is provided in the groove section of the drum, the web being perforated as shown in Figure 2 to receive the end link of the brake chain. The brake chain is thus fixed to the drum and when the drum is rotated is wound thereon. The winding drum is provided with an outer section 26 formed integral therewith and having an annular peripheral flange 27 provided with internal teeth 28, the section 27 forming in effect an annular gear member integral with the winding drum C.

The hand wheel A is of the usual design and is mounted on a shaft formed integral with the pinion B. The shaft is formed with a square section at the outer end thereof, fitting a similarly formed opening in the hub of the hand wheel and the hand wheel is secured in place by a nut 30 at the outer end of the shaft bearing on the hub of the hand wheel, a washer being preferably interposed between the nut and the wheel. The shaft 29 is journaled in an outwardly projecting boss member 31 formed on the outer wall 12 of the housing, the boss 31 being provided with a suitable journal opening to rotatably receive the shaft. The pinion B, which is formed integral with the shaft 29, meshes directly with the internal gear teeth 28 of the gear section of the brake drum C.

The bell crank lever F comprises the lever arm 32 having an inwardly extending cylindrical journal member 33 thereon, which is rotatably mounted in a bearing opening 34 provided in the outer wall 12 of the housing. At the inner end, the journal portion 33 is formed with a square section 35 on which a casting 36 is secured. The casting 36 forms the other arm of the bell crank lever. As shown in Figure 2, the casting 36 is held on the lever 32 by a nut which bears on a washer engaging the casting. As most clearly shown in Figure 3, the casting is provided with a pocket 136 in which the locking dog E is accommodated. The locking dog E has the main body portion thereof disposed within the pocket 136 and is pivotally mounted on a pin 37 extending transversely through the pocket. At the outer end the locking dog is provided with a tooth 38 which engages with the teeth of the pinion B. The dog is held yieldingly engaged with the pinion by means of a coil spring 39 which is interposed between the side of the dog remote from the pinion B and the opposed wall of the pocket 136. Pivotal movement of the dog in a clockwise direction, as viewed in Figure 3, is limited by engagement with the corresponding end wall of the pocket 136.

To limit swinging movement of the bell crank lever in a clockwise direction, as viewed in Figure 1, the housing wall 12 is provided with an outstanding stop lug 40 which engages the lever. A second stop lug 41 is also provided on the wall 12, spaced from the lug 40 to limit movement of the lever arm 32 in the reverse direction. The space between the lugs 40 and 41 is such that the lever may be swung such a distance that the locking dog will be disengaged from the pinion, the dotted line position shown in Figure 1 of the lever 32 illustrating the extreme limit of movement of the lever when the locking dog E is entirely disengaged from the pinion B. At the lower end the lever 32 is provided with an angular extension 42, which is utilized as a hand grip portion in manually operating the lever.

In assembling my improved hand brake mechanism, the pinion and pinion shaft are inserted within the outer housing section, when the parts of the housing are separated. The outer arm 32 of the bell crank lever is applied by inserting the journal portion thereof through the bearing opening 34 of the wall 12 of the housing and the casting 36 is secured in position on the inner side of said wall. The hand wheel A may then be secured to the shaft 29. With the shaft 23 assembled in position with the outer section of the housing, the brake drum is then applied and the rear wall section secured to the front section of the housing.

In the operation of tightening the brakes, the hand wheel is rotated in a clockwise direction as viewed in Figure 1, thereby rotating the gear B which meshes with the internal gear of the drum C and effecting rotation of the drum in a like direction at relatively slower speed, thereby greatly multiplying the power in tightening the brakes. While the brake winding drum C is rotated in a clockwise direction, the spring pressed dog E ratchets over the teeth of the pinion B, the dog being yieldingly swingable about the pivot 37 in a contra-clockwise direction, against the tension of the spring 39, as viewed in Figures 1 and 3. Inasmuch as the spring 39 is relatively light, vibrations of the lever arm 32 will not occur during the ratcheting movement of the locking dog and the lower end of the arm 32 of the lever will rest against the stop 40. When the winding operation is stopped or interrupted, retrograde movement of the winding drum C is prevented by the dog E. The pull of the brake chain in an unwinding direction will tend to rotate the drum in a contra-clockwise direction, as viewed in Figures 1 and 3, thereby creating a tendency for the pinion B to also rotate in a contra-clockwise direction. Rotation of the pinion B in the contra-clockwise direction is positively prevented by the dog E which is interlocked with the teeth of the pinion, the tendency of the contra-clockwise rotation of the pinion B being to swing the dog in a clockwise direction on its pivot 37 as viewed in Figures 1 and 3. Movement of the dog in this direction is positively prevented by engagement with the corresponding end wall of the pocket 136 of the casting 36. Due to the force acting on the dog E there is a tendency for the lever arm 32 of the bell crank lever F to swing in a clockwise direction about its pivot as viewed in Figures 1 and 3. Inasmuch as the bottom end of the arm 32 of the lever engages the stop lug 40, this movement is entirely prevented and the dog is held in locking engagement with the pinion B, effectively preventing rotation of the winding drum in an unwinding direction. When it is desired to release the brakes after being wound, the lever arm 32 is swung in a contra-clockwise direction to the dotted line position, as viewed in Figure 1, thereby disengaging the dog from the teeth of the pinion B and permitting rotation of the parts including the drum C in a direction to allow unwinding of the brake chain.

I have herein shown and described what I now consider the preferred manner of carrying out my invention, but the same is merely illustrative and I contemplate all changes and modifications that come within the scope of the claims appended hereto.

I claim:

1. In a hand brake, the combination with a winding member; of means for preventing retrograde movement of the winding member including a rotatable toothed member connected to said winding member and a locking means cooperating with said toothed member, said locking means including a lever, a dog pivoted on the lever and cooperating with the toothed member and means reacting between said lever and dog for yieldingly urging the dog into engagement with said toothed member, said dog having shouldered engagement with the lever to lock the dog to the toothed member, said lever being swingable in one direction to effect disengagement of the dog from the toothed member; and stop means for limiting movement of the lever in a reverse direction to maintain the dog engaged with the toothed member.

2. In a hand brake, the combination with a rotatable chain winding means; of means for preventing movement of said winding means in an unwinding direction including a toothed member operatively connected to the winding means and cooperating locking means comprising a swinging lever and a locking dog movably supported on said lever, yielding means reacting between the dog and the lever to allow yielding of the dog with respect to the lever and ratcheting of the dog on said toothed member when the winding means is rotated in a chain winding direction, said dog having shouldered engagement with the lever to prevent relative movement thereof with respect to the lever to hold the dog in locking relation to the toothed member to prevent unwinding of the winding means, said lever being movable in a direction to disengage the dog from the toothed member to permit rotation of the winding means in an unwinding direction; and stop means for locking the said lever in a reverse direction to hold the dog in locking engagement.

3. In a hand brake, the combination with rotatable means for winding a brake chain; of means for locking said rotatable means against movement in an unwinding direction including a rotatable toothed member operatively connected to said winding means, a swingable lever, a locking dog pivoted on an axis eccentric to the axis of swinging movement of the lever; spring means reacting between the lever and dog for forcing the dog into engagement with the toothed member, and permitting swinging movement of the dog on said lever in one direction, stop means on said lever for limiting swinging movement of the dog in a reverse direction to lock the dog to said toothed member to prevent unwinding of the winding means, and stop means cooperating with the lever to prevent swinging movement in one direction to hold said dog engaged, said lever being swingable in a reverse direction to disengage the dog from the toothed member to permit unwinding of the brake chain.

4. In a hand brake, the combination with a rotatable chain winding member; of means for holding said winding member against rotation in an unwinding direction, including a rotatable toothed member operatively connected to said winding member, and locking dog and a bell crank lever on which said dog is mounted, said toothed member being rotatable in a predetermined direction during the chain winding operation and in a reverse direction during the unwinding operation, one arm of said bell crank lever forming an operating handle and the dog being pivotally mounted on the other arm thereof; stop means cooperating with the handle arm of the bell crank lever to limit rotation of said lever in a reverse direction to the rotation of said toothed member during unwinding movement of the winding member; stop means on said bell crank lever for limiting pivotal movement of the locking dog about the pivotal axis thereof in a direction reverse to the rotation of said toothed member during unwinding movement of the winding member, said dog being movable in a reverse direction with respect to said lever; and yielding means reacting between said lever and dog for forcing the dog into engagement with the toothed member and permitting yielding ratcheting action of said dog on the toothed member during a chain winding operation, said operating arm of the bell crank lever being swingable away from the cooperating stop means to disengage the dog from said toothed member.

In witness that I claim the foregoing I have hereunto subscribed my name this 15th day of November, 1929.

JOHN F. O'CONNOR.